Patented Oct. 15, 1940

2,217,673

UNITED STATES PATENT OFFICE 2,217,673

INSECTICIDE

Gerald H. Coleman and Clarence L. Moyle, Midland, Mich., assignors to The Dow Chemical Company, Midland, Mich., a corporation of Michigan No Drawing. Application September 22, 1939, Serial No. 296,115

8 Claims. (Cl. 167—22)

This invention relates to insecticidal materials, and particularly to compositions in which allyl and 2-chloro-allyl esters are employed as toxic ingredients.

Many synthetic organic materials have been suggested for use as insecticidal toxicants, and particularly as substitutes for inorganic arsenicals and for pyrethrin, rotenone, and the like. Almost without exception these toxicants are so injurious to plant foliage that their use must be carefully controlled both with respect to amounts and concentrations employed and times of application. A further disadvantage accruing to many of the synthetic toxicants heretofore employed has been their toxicity to humans and their incompatibility with other common insecticidal materials. Among the esters and related products which have been suggested as insecticidal toxicants, many have been unsatisfactory because of their low toxicity, whereby such large amounts thereof are required to accomplish insect control that injury to plant foliage results. Lower concentrations of such compounds which are within the tolerance of growing vegetation are substantially ineffective against insects. Furthermore, such compounds as a class are relatively volatile, so that they do not give protection over a long period.

Synthetic ester materials which have been suggested as mothproofing toxicants include some which have not been suitable because they stiffen or are dusted out of fabric materials. Also, temporary protection only is accomplished where the compound employed is soluble in water or decomposes on weathering. A further objection has been that esters frequently have an undesirable odor, so as to be irritating to the nose and throat.

Petroleum distillate sprays comprising insecticidal plant products are widely used for control of household insect pests. Pyrethrin-containing sprays have a quick paralyzing effect on flies, but the kill obtained is low compared with the knockdown of the insects. Sprays comprising rotenone have been found to give a high moribund kill but have a relatively low rate of knockdown. A further disadvantage in the use of rotenone- or pyrethrin-containing compositions is that these toxicants are very unstable to heat and light and upon storage lose their effectiveness to an appreciable degree.

We have discovered that certain allyl and 2-chloro-allyl esters are very effective as insecticidal toxicants and that compositions comprising these products may be applied to growing foliage according to standard spray and dusting procedure without causing injury thereto. These compounds are further of value for use in mothproofing compositions, and solutions thereof in non-corrosive organic solvents have been found generally suitable as household insecticidal sprays, either alone or in combination with pyrethrin- and rotenone-containing compositions. Such compounds may be characterized by the formula

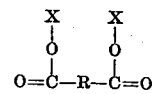

wherein R represents a hydrocarbon residue selected from the group consisting of the aromatic, aliphatic, and cycloaliphatic radicals and X represents allyl or 2-chlorallyl.

These compounds are high-boiling liquids substantially insoluble in water, but soluble in most organic solvents. Solutions and other compositions comprising small percentages thereof have been found to be substantially non-irritating and to be relatively non-toxic to higher forms of animal life. Liquid compositions comprising from about 20 to 100 grams of these esters per liter may be advantageously employed as fly sprays. Such sprays give quick knockdown and good kills and are relatively stable on exposure to air, light and heat. The diallyl and dichloroallyl esters may also be employed to fortify rotenone- or pyrethrin-containing sprays where increased kills on flies and related insects are desired. It has further been found that these esters are effective solvents and act as solubilizing agents for other organic insecticides. The amount of the ester compound preferably employed in combination with the natural occurring insecticidal plant products varies between about 5 and 50 grams per liter of spray solution.

In the protection of fur, hair, feathers, wool, and the like against the attack of clothes moths, carpet beetles, and related insects, solutions or dispersions containing from about 0.5 to about 15 per cent by weight of the ester are employed. Fabrics impregnated with such solutions and thereafter dried are protected for a long period of time against attack by such insects, are not stained, deteriorated, or caused to develop odor to an objectionable degree, or to become toxic to humans. Furthermore, the residues deposited in and on the fibers are not readily removed from the fabric by the action of water or soap solutions, or by weathering, volatilization, or sublimation.

For the control of agricultural insect pests, these allyl and 2-chloroallyl esters may be employed as toxicants in oil emulsions. They may also be employed in water suspension or emulsion along with a suitable wetting or dispersing agent. If desired, they may be absorbed or adsorbed on finely divided carriers, such as diatomaceous earth, bentonite, talc, wood flour, and the like to obtain compositions adapted to be employed either as dusts or in water suspension. The products may be incorporated in other standard-type insecticidal compositions, either as the sole toxic ingredient of such composition or in combination with common insecticidal materials, such as lead arsenate, pyrethrum, rotenone, and related compounds.

The allyl and 2-chloroallyl ester compounds which we employ as insecticidal toxicants may be prepared by esterifying 2-chloroallyl alcohol or allyl alcohol with an aromatic, aliphatic, or cycloaliphatic dicarboxylic acid or the corresponding anhydride. The esterification is preferably carried out by heating a mixture of the alcohol, acid, and a catalyst, such as sulphuric acid or benzene sulphonic acid, to a reaction temperature, generally between about 50° and 150° C., depending upon the particular reactants concerned. Water is generally formed in the reaction and, if desired, a water-immiscible organic solvent, such as benzene or toluene, may be added for the purpose of promoting the vaporization and removal of water as an azeotropic mixture with the solvent. After the reaction is complete, the desired ester compound may be recovered according to any of the usual methods of ester purification, e. g., the reacted mixture may be treated with sufficient alkali to neutralize unreacted acid, and the ester product separated by extraction and subsequent fractional distillation under reduced pressure.

The following examples are illustrative of certain modes in which our invention may be applied, but are not to be construed as limiting the same.

*Example 1*

3 milliliters of di-(2-chloroallyl) succinate (boiling at 142°–145° C. at 4 millimeters pressure and having a specific gravity of 1.261 at 20°/4° C.) was dissolved in 97 milliliters of a petroleum distillate fraction boiling at 345°–508° F. and having a flash point of 137° F. This solution was employed as a spray composition against three-day old houseflies according to the Peet-Grady method, substantially as described in Soap 8, No. 4, 1932. The composition was found to knock down 71 per cent of the flies in 10 minutes and to kill 69 per cent in 48 hours. A control pyrethrin solution containing 100 milligrams of pyrethrins per 100 milliliters of the petroleum distillate was similarly tested and found to knock down 99 per cent in 10 minutes and to kill 48 per cent in 48 hours.

A petroleum distillate spray composition comprising 2.5 grams of the di-(2-chloroallyl) succinate and 50 milligrams of pyrethrins per 100 milliliters of solution was similarly tested. This composition knocked down 100 per cent in 10 minutes and killed 91 per cent in 48 hours of the flies sprayed therewith. The freshly prepared test solutions were substantially odorless and non-irritating, and there was little apparent deterioration with respect to effectiveness of those compositions comprising the di-(2-chloroallyl) succinate.

In a similar manner, a number of related allyl and 2-chloroallyl ester compounds were tested as fly toxicants. Representative of such compounds are diallyl adipate, boiling at 141°–142° C. at 8 millimeters pressure and having a specific gravity of 1.02 at 25°/25° C., and diallyl phthalate, boiling at 172°–174° C. at 7.5 millimeters pressure and having a specific gravity of 1.118 at 25°/25° C. A 3 per cent solution of the diallyl adipate knocked down 82 per cent of the flies and killed 75 per cent in 48 hours. A 3 per cent solution of the diallyl phthalate in a similar determination knocked down 80 per cent and killed 61 per cent of the test insects.

*Example 2*

A number of samples of white wool cloth were saturated with a 3 per cent solution of di-(2-chloroallyl) succinate in methyl ethyl ketone and allowed to dry. Five larvae of the black carpet beetle were placed on each dried sample. Each sample was then placed in a closed cardboard box, incubated at 80° F. over a period of 3 weeks, and thereafter examined to determine the amount of feeding or other attack directly attributable to the beetle larvae. Simultaneous tests were made with larvae upon untreated samples of the cloth. Examination of incubated samples impregnated with the di-(2-chloroallyl) succinate showed that after 3 weeks the cloth was undamaged by the larvae and all of the larvae were dead. The untreated controls showed heavy feeding at the end of 3 weeks' incubation with a 100 per cent survival of the test larvae. Determinations carried out over the same period upon wool cloth treated with methyl ethyl ketone alone showed heavy feeding at the end of the 3-week period with 100 per cent survival. The di-(2-chloroallyl) succinate caused no noticeable staining, stiffness, or oiliness of the treated fabric.

*Example 3*

A spray composition was prepared by emulsifying 3 pounds of the di-(2-chloroallyl) ester of 4-cyclohexene-1, 2-dicarboxylic acid (boiling at 193° C. at 8 millimeters pressure and having a specific gravity of 1.249 at 25°/4° C.) in 100 gallons of water. A sodium salt of lauryl sulphate was employed as the emulsifier. This composition was sprayed on potato vines heavily infested with Colorado potato beetle larvae. A 55 per cent control of the beetle larvae was observed after 48 hours. This composition was compared with lead arsenate at 3 pounds per 100 gallons of water with respect to injury to growing plants resulting from their application. In carrying out this determination, Soya bean foliage was sprayed with the aqueous dispersions of the di-(2-chloroallyl) ester and lead arsenate. 48 hours after application, 30 per cent of that foliage contacted with lead arsenate showed severe injury. Less than 10 per cent injury was caused by the di-(2-chloroallyl) ester.

In a similar manner, the compounds described in the foregoing examples may be employed to replace, wholly or in part, petroleum distillate fractions commonly used in oil emulsion compositions, whereby improved control of insects and reduced injury from the application of such spray compositions results. The compounds may also be incorporated in amounts ranging between 1 and 10 per cent by weight with such diluents as walnut shell flour, redwood flour, and the like, and the resulting composition employed according to standard dusting procedure for the control of such pests as citrus red mite, black scale, and the like. Similarly, aqueous dispersions of these esters may be applied for the control of aphis, scale, red spider, and related insects.

Other compounds which may be employed substantially as described in the foregoing examples for the control of common agricultural and household insect pests include the diallyl ester of 4-cyclohexene-1, 2-dicarboxylic acid, boiling at 150°–152° C. at 8 millimeters pressure and having a specific gravity of 1.09 at 25°/25° C.; diallyl sebacate, boiling at 135°–137° C. at 2 millimeters pressure and having the specific gravity 0.976 at 20°/4° C.; diallyl succinate, boiling at 118°–120° C. at 0.3 inch pressure and having a specific gravity of 1.052 at 25°/25° C.; diallyl malonate, boiling at 108°–109° C. at 9 millimeters pressure and having a specific gravity of 1.067 at 25°/25° C.; di-(2-chloroallyl) sebacate; di-(2-chloroallyl) adipate, boiling at 173°–175° C. at 4 millimeters pressure and having a specific gravity of 1.193 at 20°/4° C.; di-(2-chloroallyl) phthalate, boiling at 176°–178° C. at 2 millimeters pressure and having a specific gravity of 1.288 at 20°/4° C.; di-(2-chlorallyl) maleate, boiling at 155°–160° C. at 5 millimeters pressure; di-(2-chloroallyl) sym.-dimethyl succinate; di-(2-chloroallyl) pimelate; the di-(2-chloroallyl) ester of naphthalene-1, 2-dicarboxylic acid, etc.

The phrase "non-corrosive organic solvent" as employed in certain of the following claims refers to any organic solvent material unreactive with and capable of dissolving the toxicants hereinbefore described and non-injurious to the skin and general health of humans. Besides petroleum distillate and methyl ethyl ketone, as disclosed in the foregoing examples, solvents such as benzene, ethylene chloride, hydrogenated naphthalene, ethyl alcohol, butyl alcohol, and the like are included within this definition.

Other modes of applying the principle of our invention may be employed instead of those explained, change being made as regards the materials or their amounts employed, provided the ingredients stated by any of the following claims or their equivalent be employed.

We therefore particularly point out and distinctly claim as our invention:

1. An insecticidal composition comprising as a toxic ingredient an ester having the following formula

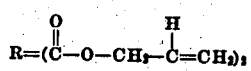

wherein R represents a hydrocarbon residue selected from the group consisting of the aromatic, aliphatic, and cycloaliphatic radicals and X is selected from the class consisting of the allyl and 2-chloroallyl radicals.

2. An insecticidal composition comprising as a toxic ingredient an ester having the formula

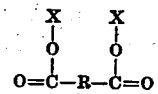

wherein R represents a hydrocarbon residue selected from the group consisting of the aromatic, aliphatic, and cycloaliphatic radicals.

3. An insecticidal composition comprising as a toxic ingredient an ester having the formula

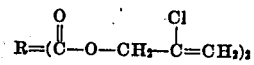

wherein R represents a hydrocarbon residue selected from the group consisting of the aromatic, aliphatic, and cycloaliphatic radicals.

4. An insecticidal composition comprising as a toxic ingredient an ester having the formula

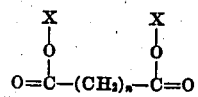

wherein $n$ represents an integer not greater than 8 and X represents a member of the class consisting of the allyl and 2-chloroallyl radicals.

5. An insecticidal spray comprising as a toxic ingredient an ester having the following formula

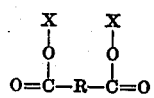

wherein R represents a hydrocarbon residue selected from the group consisting of the aromatic, aliphatic, and cycloaliphatic radicals and X is selected from the class consisting of the allyl and 2-chloroallyl radicals.

6. An insecticide comprising a non-corrosive organic solvent having dissolved therein as an active toxicant a compound having the formula

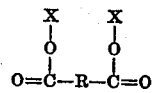

wherein R represents a hydrocarbon residue selected from the group consisting of the aromatic, aliphatic, and cycloaliphatic radicals and X is selected from the class consisting of the allyl and 2-chloroallyl radicals.

7. An insecticidal spray comprising a non-corrosive organic solvent having dissolved therein an extract of a pyrethrin-bearing plant and as an added toxicant a compound having the formula

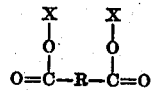

wherein R represents a hydrocarbon residue selected from the group consisting of the aromatic, aliphatic, and cycloaliphatic radicals and X is selected from the class consisting of the allyl and 2-chloroallyl radicals.

8. A composition consisting of material liable to attack by moths having incorporated therein a compound having the formula

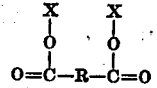

wherein R represents a hydrocarbon residue selected from the group consisting of the aromatic, aliphatic, and cycloaliphatic radicals and X is selected from the class consisting of the allyl and 2-chloroallyl radicals.

GERALD H. COLEMAN.
CLARENCE L. MOYLE.